(12) United States Patent
Sobue et al.

(10) Patent No.: US 11,220,267 B2
(45) Date of Patent: Jan. 11, 2022

(54) VEHICLE CONTROL DEVICE AND FOUR-WHEEL DRIVE VEHICLE

(71) Applicant: JTEKT CORPORATION, Osaka (JP)

(72) Inventors: Kaoru Sobue, Nagoya (JP); Go Nagayama, Toyama (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/134,760

(22) Filed: Dec. 28, 2020

(65) Prior Publication Data

US 2021/0206373 A1 Jul. 8, 2021

(30) Foreign Application Priority Data

Jan. 6, 2020 (JP) .............................. JP2020-000456

(51) Int. Cl.
| | | |
|---|---|---|
| *B60W 10/119* | (2012.01) | |
| *B60W 30/184* | (2012.01) | |
| *B60W 30/18* | (2012.01) | |
| *B60K 17/06* | (2006.01) | |
| *B60K 17/35* | (2006.01) | |

(52) U.S. Cl.
CPC ...... *B60W 30/1843* (2013.01); *B60W 10/119* (2013.01); *B60W 30/18172* (2013.01); *B60K 17/06* (2013.01); *B60K 17/35* (2013.01); *B60W 2510/107* (2013.01); *B60W 2520/26* (2013.01)

(58) Field of Classification Search
CPC ....... B60W 30/1843; B60W 30/18172; B60W 10/119; B60W 2510/107; B60W 2520/26; B60K 17/06; B60K 17/35; B60K 17/02; B60K 2023/0858; B60K 2023/0833; B60K 17/34; B60Y 2400/4244; B60Y 2400/404

See application file for complete search history.

(56) References Cited

U.S. PATENT DOCUMENTS

2019/0381989 A1* 12/2019 Nozu ..................... B60T 8/1769
2019/0389305 A1* 12/2019 Shimizu .......... B60W 30/18172

FOREIGN PATENT DOCUMENTS

| DE | 102016217547 A1 * | 3/2018 | ........ B60W 30/1843 |
| JP | 2002-349604 A | 12/2002 | |
| JP | 2017-87984 A | 5/2017 | |
| WO | WO-2018105435 A1 * | 6/2018 | .............. B60L 15/20 |

* cited by examiner

*Primary Examiner* — Justin Holmes
(74) *Attorney, Agent, or Firm* — Oblon, McClelland, Maier & Neustadt, L.L.P.

(57) ABSTRACT

A vehicle control device mounted on a four-wheel drive vehicle including a driving force transmission system includes an electronic control unit. The electronic control unit calculates a command torque based on vehicle information. The electronic control unit estimates a temperature of a heat generating location in the driving force transmission system based on the command torque. The electronic control unit estimates the temperature of the heat generating location based on an estimated value of a driving force input to an input rotating member, when it is not possible for the driving force corresponding to the command torque to be transmitted to auxiliary drive wheels due to a magnitude of the driving force generated by a drive source or occurrence of a wheel slip.

9 Claims, 4 Drawing Sheets

VEHICLE CONTROL DEVICE AND FOUR-WHEEL DRIVE VEHICLE

CROSS-REFERENCE TO RELATED APPLICATION

This application claims priority to Japanese Patent Application No. 2020-000456 filed on Jan. 6, 2020, incorporated herein by reference in its entirety.

BACKGROUND

1. Technical Field

The disclosure relates to a vehicle control device for a four-wheel drive vehicle equipped with a driving force transmission system that distributes a driving force of a drive source to main drive wheels and auxiliary drive wheels, and the four-wheel drive vehicle.

2. Description of Related Art

Vehicle control devices equipped with control units are known that estimate the temperature of a heat generating location of a driving force transmission system of a four-wheel drive vehicle having main drive wheels and auxiliary drive wheels, and reduce a driving force transmitted to the auxiliary drive wheels when the estimated temperature is equal to or higher than a predetermined value (see, for example, Japanese Unexamined Patent Application Publication No. 2002-349604 (JP 2002-349604 A) and Japanese Unexamined Patent Application Publication No. 2017-87984 (JP 2017-87984 A)). The control devices control a driving force transmission device in which the driving force transmitted to the auxiliary drive wheel side can be adjusted by a clutch, and also estimate the temperature of the heat generating location by integrating the amount of generated heat calculated based on the driving force transmitted by the driving force transmission device.

SUMMARY

However, when the temperature of the heat generating location in the driving force transmission system is estimated based on the command value of the clutch engagement force in the driving force transmission device, a temperature higher than the actual temperature may be estimated depending on a traveling condition, for example, when traveling on a low μ road where a wheel slip (idle) is likely to occur.

The disclosure can improve the accuracy of temperature estimation of a heat generating location in a driving force transmission system of a four-wheel drive vehicle.

A first aspect of the disclosure relates to a vehicle control device. The vehicle control device is mounted on a four-wheel drive vehicle including a driving force transmission system that distributes a driving force of a drive source to main drive wheels and auxiliary drive wheels. The vehicle control device controls a driving force transmission device by which the driving force transmitted to the auxiliary drive wheels is adjustable. The vehicle control device includes an electronic control unit. The electronic control unit is configured to calculate a command torque based on vehicle information. The command torque indicating the driving force to be transmitted from an input rotating member of the driving force transmission device to an output rotating member of the driving force transmission device. The electronic control unit is configured to estimate a temperature of a heat generating location in the driving force transmission system based on the command torque. The electronic control unit is configured to estimate the temperature of the heat generating location based on an estimated value of the driving force input to the input rotating member, when the driving force corresponding to the command torque is not able to be transmitted to the auxiliary drive wheels due to a magnitude of the driving force generated by the drive source or occurrence of a wheel slip.

With the above configuration, it is possible to improve the accuracy of temperature estimation of the heat generating location in the driving force transmission system of the four-wheel drive vehicle.

A second aspect of the disclosure relates to a four-wheel drive vehicle. The four-wheel drive vehicle includes a driving force transmission system configured to distribute a driving force of a drive source to main drive wheels and auxiliary drive wheels, and a vehicle control device that includes an electronic control unit configured to control a driving force transmission device by which the driving force transmitted to the auxiliary drive wheels is adjustable. The electronic control unit is configured to calculate a command torque indicating the driving force to be transmitted from an input rotating member of the driving force transmission device to an output rotating member of the driving force transmission device, based on vehicle information. The electronic control unit is configured to estimate a temperature of a heat generating location in the driving force transmission system based on the command torque. The electronic control unit is configured to estimate the temperature of the heat generating location based on an estimated value of the driving force input to the input rotating member, when the driving force corresponding to the command torque is not able to be transmitted to the auxiliary drive wheels due to a magnitude of the driving force generated by the drive source or occurrence of a wheel slip.

With the above configuration, it is possible to improve the accuracy of temperature estimation of the heat generating location in the driving force transmission system of the four-wheel drive vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

An embodiment of the disclosure will be described with reference to FIGS. 1 to 4. It is to be noted that the embodiment described below is shown as preferred specific examples for implementing the disclosure. Although some part of the embodiment specifically illustrates various technically preferable matters. However, the technical scope of the disclosure is not limited to such specific aspects.

Figure 1:
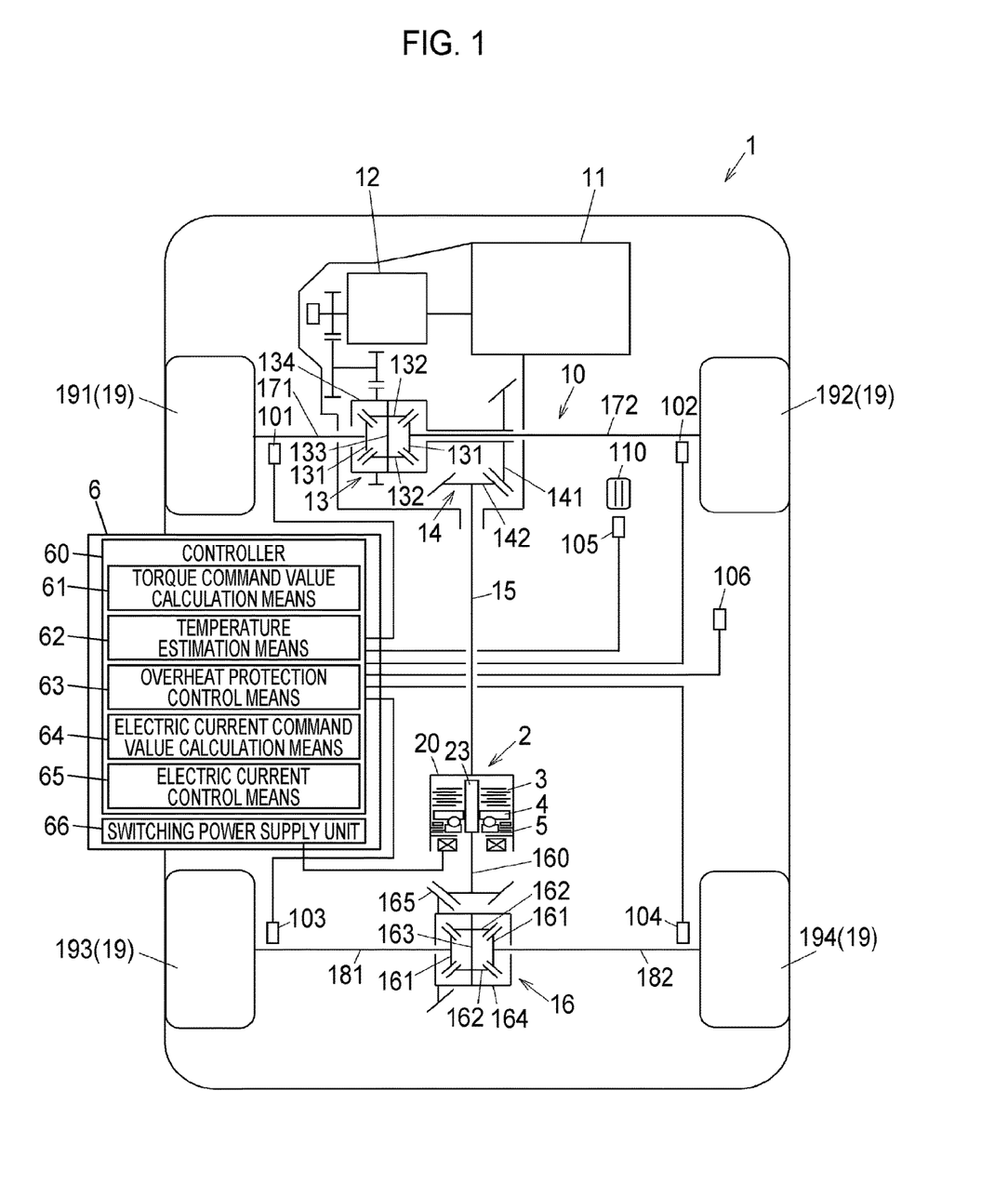
FIG. 1 is a schematic configuration diagram of a schematic configuration example of a four-wheel drive vehicle on which a control device of a driving force transmission device according to an embodiment of the disclosure is mounted.

FIG. 1 is a schematic configuration diagram of a schematic configuration example of a four-wheel drive vehicle on which a control device of a driving force transmission device according to an embodiment of the disclosure is mounted.

As illustrated in FIG. 1, the four-wheel drive vehicle 1 includes an engine 11 as a drive source that generates a driving force in proportion to an operation amount of an accelerator pedal 110 (accelerator operation amount), a transmission 12 that shifts the output of the engine 11, right and left front wheels 192, 191, as main drive wheels, to which the driving force of the engine 11 shifted by the transmission 12 is constantly transmitted, and right and left rear wheels 194, 193 as auxiliary drive wheels, to which the driving force of the engine 11 are transmitted according to vehicle information of the four-wheel drive vehicle 1. Wheel speed sensors 101, 102, 103, 104 are disposed on the right and left front wheels 192, 191 and the right and left rear wheels 194, 193, respectively. An electric motor may be used as the drive source, or the engine and the electric motor may be combined as the drive source. In the following description, the right and left front wheels 192, 191 and the right and left rear wheels 194, 193 may be collectively referred to as wheels 19.

The four-wheel drive vehicle 1 includes a driving force transmission system 10 that distributes the driving force of the engine 11 to the right and left front wheels 192, 191 and the right and left rear wheels 194, 193. The driving force transmission system 10 includes a front differential 13 and a transfer 14 disposed close to the front wheels, a propeller shaft 15 that transmits the driving force in the front-rear direction of the vehicle, a rear differential 16 disposed close to the rear wheels, a pinion gear shaft 160 that transmits the driving force to the rear differential 16, drive shafts 171, 172 on the right and left front wheels, drive shafts 181, 182 on the right and left rear wheels, and a driving force transmission device 2 disposed between the propeller shaft 15 and the pinion gear shaft 160. The driving force transmission device 2 is controlled by an in-vehicle control device 6.

The driving force transmission device 2 transmits, from the propeller shaft 15 to the pinion gear shaft 160, a driving force corresponding to electric current supplied from the control device 6. The driving force of the engine 11 is transmitted to the right and left rear wheels 194, 193 through the driving force transmission device 2. The control device 6 can obtain wheel speed information indicating rotation speeds of the right and left front wheels 192, 191 and the right and left rear wheels 194, 193 detected by the wheel speed sensors 101, 102, 103, 104, accelerator operation amount information indicating the amount of operation of the accelerator pedal 110 detected by an accelerator pedal sensor 105, and outside air temperature information detected by an outside air temperature sensor 106, and controls the driving force transmission device 2 by supplying electric current to the driving force transmission device 2. Hereinafter, the electric current output by the control device 6 to control the driving force transmission device 2 is referred to as a control current.

The driving force of the engine 11 is transmitted to the right and left front wheels 192, 191 through the transmission 12, the front differential 13, and the drive shafts 171, 172 at the right and left front wheels. The front differential 13 has a pair of side gears 131 connected to the drive shafts 171, 172 at the right and left front wheels, respectively, such that the drive shafts 171, 172 cannot rotate relative to each other, a pair of pinion gears 132 that meshes with the side gears 131 with their gear axes orthogonal to each other, a pinion gear shaft 133 that supports the pinion gears 132, and a front differential case 134 that accommodates the above mentioned parts.

The transfer 14 has a pinion gear 141 fixed to the front differential case 134 and a ring gear 142 connected to a first end of the propeller shaft 15 on the front side of the vehicle and meshing with the pinion gear 141, and transmits the driving force to the propeller shaft 15. The pinion gear 141 and the ring gear 142 are made of hypoid gears and are lubricated by lubricating oil. A second end of the propeller shaft 15 on the rear side of the vehicle is connected to a housing 20 of the driving force transmission device 2. The driving force transmission device 2 has an inner shaft 23 disposed to be rotatable relative to the housing 20, and the pinion gear shaft 160 is connected to the inner shaft 23 so as not to be rotatable relative to each other. The driving force transmission device 2 will be described in detail later.

The rear differential 16 has a pair of side gears 161 connected to the drive shafts 181, 182 at the right and left rear wheels, respectively, such that the drive shafts 181, 182 cannot rotate relative to each other, a pair of pinion gears 162 that meshes with the side gears 161 with their gear axes orthogonal to each other, a pinion gear shaft 163 that supports the pinion gears 162, a rear differential case 164 that accommodates the above mentioned parts, and a ring gear 165 made of a hypoid gear and fixed to the rear differential case 164 and meshing with the pinion gear shaft 160.

Configuration of Driving Force Transmission Device

Figure 2:
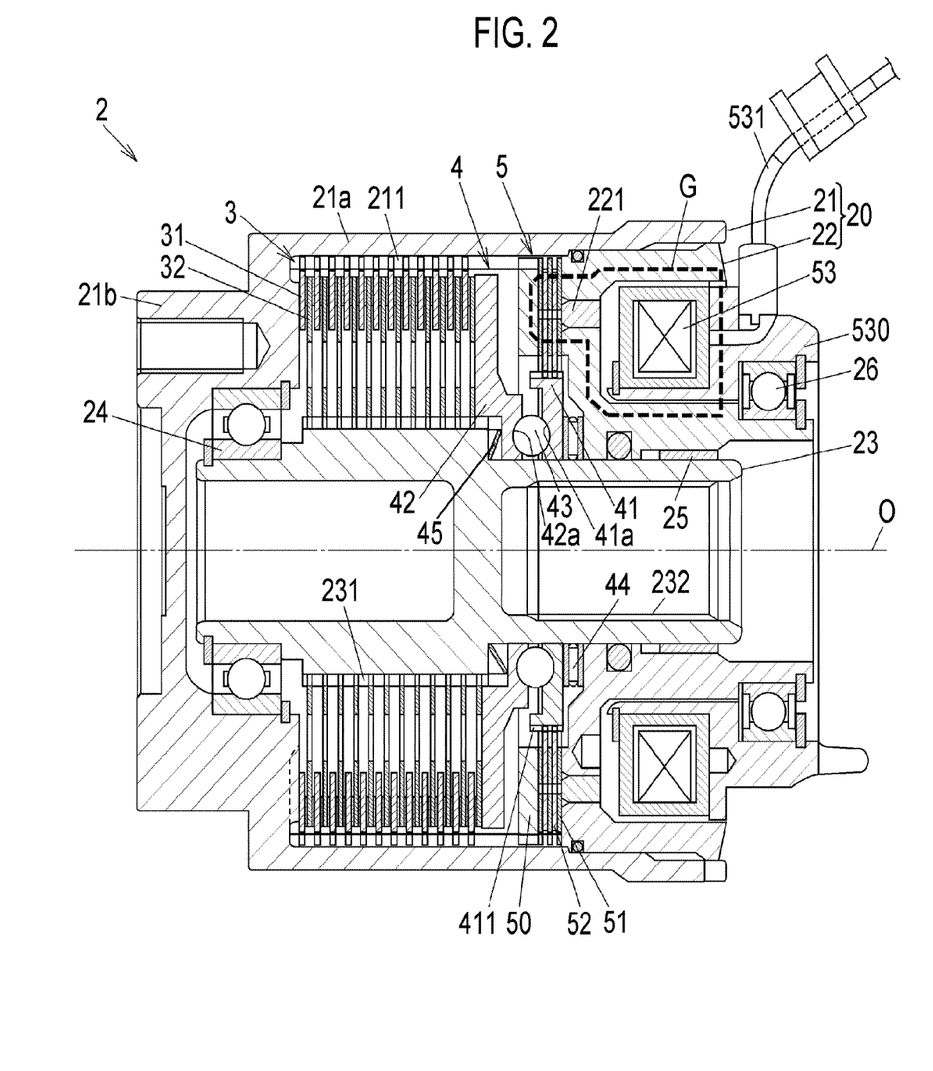
FIG. 2 is a cross-sectional view of a configuration example of the driving force transmission device.

FIG. 2 is a cross-sectional view illustrating a configuration example of the driving force transmission device 2. In FIG. 2, the upper portion of the rotation axis O shows an operating state (torque transmission state) of the driving force transmission device 2, and the lower portion thereof shows a non-operating state (torque non-transmission state) of the driving force transmission device 2. Hereinafter, the direction parallel to the rotation axis O is referred to as an axial direction.

The driving force transmission device 2 is configured to have the housing 20 including a front housing 21 and a rear housing 22, a tubular inner shaft 23 supported to be rotatable relative to the housing 20 on the common axis, a main clutch 3 disposed between the housing 20 and the inner shaft 23, a cam mechanism 4 that generates a thrust force pressing the main clutch 3, and an electromagnetic clutch mechanism 5 that operates the cam mechanism 4 by receiving the supply of control current from the control device 6. The housing 20 is an example of an input rotating member of the disclosure, and the inner shaft 23 is an example of an output rotating member of the disclosure. Lubricating oil (not illustrated) is sealed inside the housing 20.

The front housing 21 has a bottomed cylindrical shape having a cylindrical tubular portion 21a and a bottom portion 21b integrally, and the propeller shaft 15 (see FIG. 1) is connected to the bottom portion 21b through, for example, a cross joint. A plurality of outer spline protrusions 211 extending in the axial direction are formed on the inner surface of the tubular portion 21a. The rear housing 22 is partially formed of a ring-shaped non-magnetic material 221 in the radial direction, and rotates integrally with the front housing 21.

The inner shaft 23 is supported on the inner peripheral side of the housing 20 by bearings 24, 25, and has a plurality of inner spline protrusions 231 extending in the axial direction on the outer peripheral surface. Further, on the inner surface of one end portion of the inner shaft 23, a spline fitting portion 232 is formed in which one end portion of the pinion gear shaft 160 (see FIG. 1) is fitted so as not to be rotatable relative to each other.

The main clutch 3 includes a plurality of main outer clutch plates 31 and a plurality of main inner clutch plates 32, which are alternately disposed in the axial direction. The outer peripheral end portion of the main outer clutch plate 31 is engaged with the outer spline protrusion 211 of the front housing 21. The inner peripheral end portion of the main inner clutch plate 32 is engaged with the inner spline protrusion 231 of the inner shaft 23.

A cam mechanism 4 is configured to have a pilot cam 41 that receives the rotational force of the housing 20 through the electromagnetic clutch mechanism 5, a main cam 42 that presses the main clutch 3 in the axial direction, and a plurality of spherical cam balls 43 disposed between the pilot cam 41 and the main cam 42. A plurality of cam grooves 41a, 42a of which axial depths change along the circumferential direction are formed on the facing surfaces of the pilot cam 41 and the main cam 42, respectively, and the cam balls 43 are disposed between the cam grooves 41a, 42a. A thrust bearing 44 is disposed between the pilot cam 41 and the rear housing 22. The main cam 42 is engaged with the inner spline protrusion 231 of the inner shaft 23 so as not to be rotatable relative to each other and to be axially movable, and is urged toward the pilot cam 41 by a disc spring 44 as a return spring.

The electromagnetic clutch mechanism 5 is configured to have an armature 50, a plurality of pilot outer clutch plates 51, a plurality of pilot inner clutch plates 52, and an electromagnetic coil 53. The electromagnetic coil 53 is held in a yoke 530 supported by a bearing 26 in the rear housing 22. The control current from the control device 6 is supplied to the electromagnetic coil 53 as an exciting current through an electric wire 531.

The pilot outer clutch plates 51 and the pilot inner clutch plates 52 are alternately disposed in the axial direction between the armature 50 and the rear housing 22. The end portions of the pilot outer clutch plate 51 and the armature 50 at the outer peripheral side are engaged with the outer spline protrusions 211 of the front housing 21. The end of the pilot inner clutch plate 52 at the inner peripheral side is engaged with spline protrusions 411 of the pilot cam 41.

In the driving force transmission device 2 configured as described above, magnetic flux is generated in a magnetic path G by the control current supplied to the electromagnetic coil 53 and the armature 50 is attracted toward the rear housing 22, and thus the pilot outer clutch plates 51 and the pilot inner clutch plates 52 come into frictional contact with each other. As a result, the rotational force corresponding to the control current is transmitted to the pilot cam 41 and the pilot cam 41 rotates relative to the main cam 42, making the cam balls 43 rolling in the cam grooves 41a, 42a. With the rolling of the cam balls 43, a thrust force for pressing the main clutch 3 is generated on the main cam 42, and a frictional force is generated between the main outer clutch plates 31 and the main inner clutch plates 32. Then, the driving force is transmitted from the housing 20 to the inner shaft 23, that is, from the propeller shaft 15 to the pinion gear shaft 160, by the frictional force. The control device 6 can adjust the driving force transmitted from the driving force transmission device 2 to the right and left rear wheels 194, 193 by increasing or decreasing the control current.

Configuration of Control Device

As illustrated in FIG. 1, the control device 6 includes a controller 60 having a central processing unit (CPU) (calculation processing device) and a switching power supply unit 66 that switches a voltage of a direct current (DC) power supply such as a battery and supplies electric current to the electromagnetic coil 53 of the driving force transmission device 2. The switching power supply unit 66 has a switching element such as a transistor, switches a direct current (DC) voltage based on a pulse width modulation (PWM) signal output from the controller 60, and generates a control current to be supplied to the electromagnetic coil 53.

In the controller 60, the CPU executes a program stored in the non-volatile storage element to function as torque command value calculation means 61, temperature estimation means 62, overheat protection control means 63, electric current command value calculation means 64, and electric current control means 65.

The torque command value calculation means 61 calculates a torque command value indicating the magnitude of the driving force to be transmitted from the housing 20 to the inner shaft 23 based on the vehicle information. The temperature estimation means 62 estimates the temperature of the heat generating location in the driving force transmission system 10 based on the torque command value. When determination is made that the heat generating location is in an overheated state by the temperature estimated by the temperature estimation means 62, the overheat protection control means 63 reduces the driving force transmitted by the driving force transmission device 2 to suppress heat generation at the heat generating location. The electric current command value calculation means 64 calculates an electric current command value, which is a target value of the control current supplied to the electromagnetic coil 53, according to the torque command value. The electric current control means 65 performs electric current feedback control such that the electric current corresponding to the electric current command value calculated by the electric current command value calculation means 64 is supplied to the electromagnetic coil 53.

Figure 3:
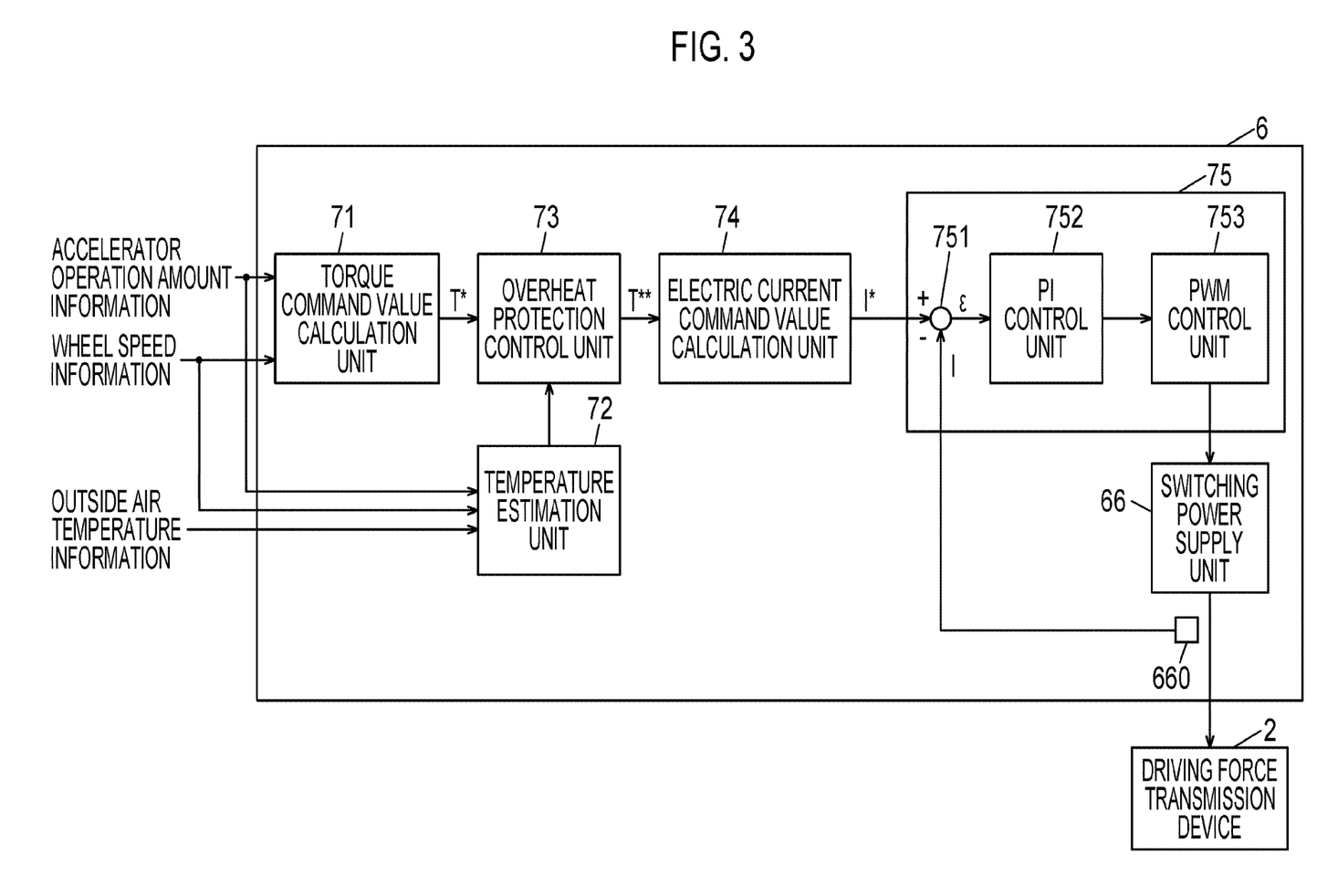
FIG. 3 is a control block diagram of an example of a control configuration in the control device.

FIG. 3 is a control block diagram illustrating an example of a control configuration of the control device 6. In the control block diagram, a torque command value calculation unit 71, the temperature estimation unit 72, the overheat protection control unit 73, the electric current command value calculation unit 74, and the electric current control unit 75 are constructed by the torque command value calculation means 61 and the temperature estimation means 62, the overheat protection control means 63, the electric current command value calculation means 64, and the electric current control means 65, respectively.

The torque command value calculation unit 71 calculates a torque command value T* based on the wheel speed information of the right and left front wheels 192, 191 and the right and left rear wheels 194, 193 detected by the wheel speed sensors 101, 102, 103, 104, and accelerator operation amount information detected by the accelerator pedal sensor 105. The wheel speed information and the accelerator operation amount information are examples of the vehicle information. The torque command value calculation unit 71 set the torque command value T* to be larger as the accelerator operation amount is larger and as a front and rear wheel differential rotational speed, which is the difference between the average rotational speed of the right and left front wheels 192, 191 and the average rotational speed of the right and left rear wheels 194, 193, is higher. The vehicle information is not limited to wheel speed information and accelerator operation amount information, and for example, detection values of various in-vehicle sensors such as detection values of yaw rate sensors and steering angle sensors can be used.

The temperature estimation unit 72 estimates the temperature of the heat generating location based on the torque command value T* calculated by the torque command value calculation unit 71, the accelerator operation amount information, the wheel speed information, and the outside air temperature information Processing contents of the temperature estimation unit 72 will be described in detail later. When the temperature calculated by the temperature estimation unit 72 is equal to or higher than a threshold value, the overheat protection control unit 73 corrects the torque command value T* calculated by the torque command value calculation unit 71 by reduction to calculate a correction torque command value T**.

The electric current command value calculation unit 74 calculates the electric current command value by referring to, for example, map information indicating a relationship between the driving force (transmission torque) transmitted by the driving force transmission device 2 and the control current. The electric current control unit 75 includes a deviation calculation unit 751, a proportional-integral (PI) control unit 752, and a PWM control unit 753. The deviation calculation unit 751 calculates the deviation ε between the actual electric current value I, which is the detected value of the control current detected by an electric current sensor 660, and a command electric current value I*. The PI control unit 752 performs the electric current feedback control by performing a PI calculation on the deviation ε calculated by the deviation calculation unit 751 and calculating a duty ratio of the PWM signal output to the switching power supply unit 66 such that the actual electric current value I approaches the command electric current value I*. The PWM control unit 753 generates a PWM signal for turning on or off the switching element of the switching power supply unit 66 based on the duty ratio calculated by the PI control unit 752, and outputs the PWM signal to the switching power supply unit 66.

In the embodiment, the temperature estimation unit 72 estimates the temperature of the transfer 14 as a heat generating location of the driving force transmission system 10. The temperature estimation unit 72 normally calculates the temperature Temp of the transfer 14 by estimation using the following equation (1).

$$\text{Temp} = K1 + To + K2 \times H(n) \quad (1)$$

Here, K1 and K2 are coefficients set in advance based on, for example, an experiment or a simulation, and To is an outside air temperature detected by the outside air temperature sensor 106. H(n) is the load amount of the transfer 14 in the n-th calculation (n is a natural number) after the engine 11 is started. H(n) is obtained by the following equation (2).

$$H(n) = K3 \times \Sigma\{K4 \times T^* \times Vf - K5 \times H(n-1)\} \quad (2)$$

Here, K3, K4, and K5 are coefficients set in advance based on, for example, an experiment or simulation, and T* is a torque command value calculated by the torque command value calculation unit 71. Vf is the average wheel speed of the right and left front wheels 192, 191, and H(n−1) is the previous value of the load amount of the transfer 14. The temperature estimation unit 72 calculates the load amount of the transfer 14 and the temperature Temp of the transfer 14 every predetermined control cycle (for example, 5 ms). The term "K5×H(n−1)" in the equation (2) corresponds to the amount of heat radiated from the transfer 14, and Vf corresponds to the rotation speed of the pinion gear 141 of the transfer 14.

When a slip (idle) occurs in the wheels 19, the driving force having a magnitude corresponding to the torque command value T* may not be transmitted from the driving force transmission device 2 to the rear differential 16. Further, even when the driving force (input torque) transmitted from the engine 11 to the housing 20 of the driving force transmission device 2 is smaller than the torque command value T*, the driving force corresponding to the torque command value T* cannot be transmitted from the driving force transmission device 2 to the rear differential 16. In this case, the load amount H(n) of the transfer 14 cannot be accurately calculated by the equation (2), and as a result, the temperature Temp of the transfer 14 cannot be accurately calculated.

Therefore, in the embodiment, when the driving force of the magnitude corresponding to the command torque T* cannot be transmitted from the driving force transmission device 2 to the right and left rear wheels 194, 193 due to the magnitude of the driving force generated by the engine 11 or occurrence of a slip in the wheels 19, the temperature estimation unit 72 estimates the temperature of the transfer 14 based on the estimated value of the driving force input to the housing 20 of the driving force transmission device 2.

The estimated value is a calculated value of the driving force transmitted from the engine 11 to the housing 20 of the driving force transmission device 2 through the propeller shaft 15, when no slip occurs in the wheels 19 and the driving force corresponding to the command torque T* cannot be transmitted from the driving force transmission device 2 to the right and left rear wheels 194, 193 since the magnitude of the driving force generated by the engine 11 is small. The calculated value can be obtained by multiplying, for example, the magnitude of the driving force of the engine 11 (torque of the crankshaft which is the output shaft) obtained by the operation amount of the accelerator pedal 110 by the gear ratio of the transmission 12 and the gear ratio of the transfer 14. Hereinafter, the torque obtained by multiplying the driving force generated by the engine 11 by the gear ratio of the transmission 12 and the gear ratio of the transfer 14, that is, the torque of the propeller shaft 15 is referred to as "on-shaft torque". The on-shaft torque is a converted value obtained by converting the torque of the output shaft of the engine 11 into the input torque input to the housing 20 of the driving force transmission device 2.

Further, when a slip occurs in at least one of the right and left rear wheels 194, 193, the estimated value of the driving force input to the housing 20 of the driving force transmission device 2 is a converted value obtained by converting grip forces of the right and left rear wheels 194, 193 in which the slip occurs into the torque of the propeller shaft 15, that is, the torque of the housing 20 of the driving force transmission device 2. Further, when a slip occurs in at least one of the right and left front wheels 192, 191, the estimated value of the driving force input to the housing 20 of the driving force transmission device 2 is calculated value obtained by subtracting, from the on-shaft torque, a converted value obtained by converting grip forces of the right and left front wheels 192, 191 in which the slip occurs into the torque of the housing 20 of the driving force transmission device 2. The converted value Tg obtained by converting the grip forces into the torque of the housing 20 of the driving force transmission device 2 is obtained by the following equation (3).

$$Tg = rt/R \times W \times \mu \quad (3)$$

Here, rt is the tire radius of the wheels 19, and Rf is the gear ratio of the transfer 14. W is a front wheel load when a slip occurs in one or both of the right and left front wheels 192, 191, and a rear wheel load when a slip occurs in one or both of the right and left rear wheels 194, 193. μ is a coefficient of friction (coefficient of dynamic friction) between the tires of the wheels 19 and the road surface. Here, it is assumed that the gear ratio of the transfer 14 (the pair teeth of the ring gear 142/the number of teeth of the pinion gear 141) and a reduction ratio of the rear differential 16 (the number of teeth of the ring gear 165/the number of teeth of the pinion gear shaft 160) are the same.

Further, a road surface friction coefficient μ may be a value estimated from, for example, a road surface condition imaged by an in-vehicle camera may be used, or may be obtained by the following equation (4).

$$\mu = \sqrt{G1o^2 + G1a^2} \quad (4)$$

Here, G1o is the acceleration in the front-rear direction of the vehicle, and G1a is the acceleration in the lateral direction (width direction of the vehicle). The values of the accelerations can be obtained from the detected values of an acceleration sensor. If the road surface friction coefficient is zero, both the acceleration in the vehicle front-rear direction and the acceleration in the lateral direction are zero, and thus, according to the equation (4), the road surface friction coefficient can be estimated from the actually generated accelerations in the front-rear direction and the lateral direction of the vehicle.

Figure 4:
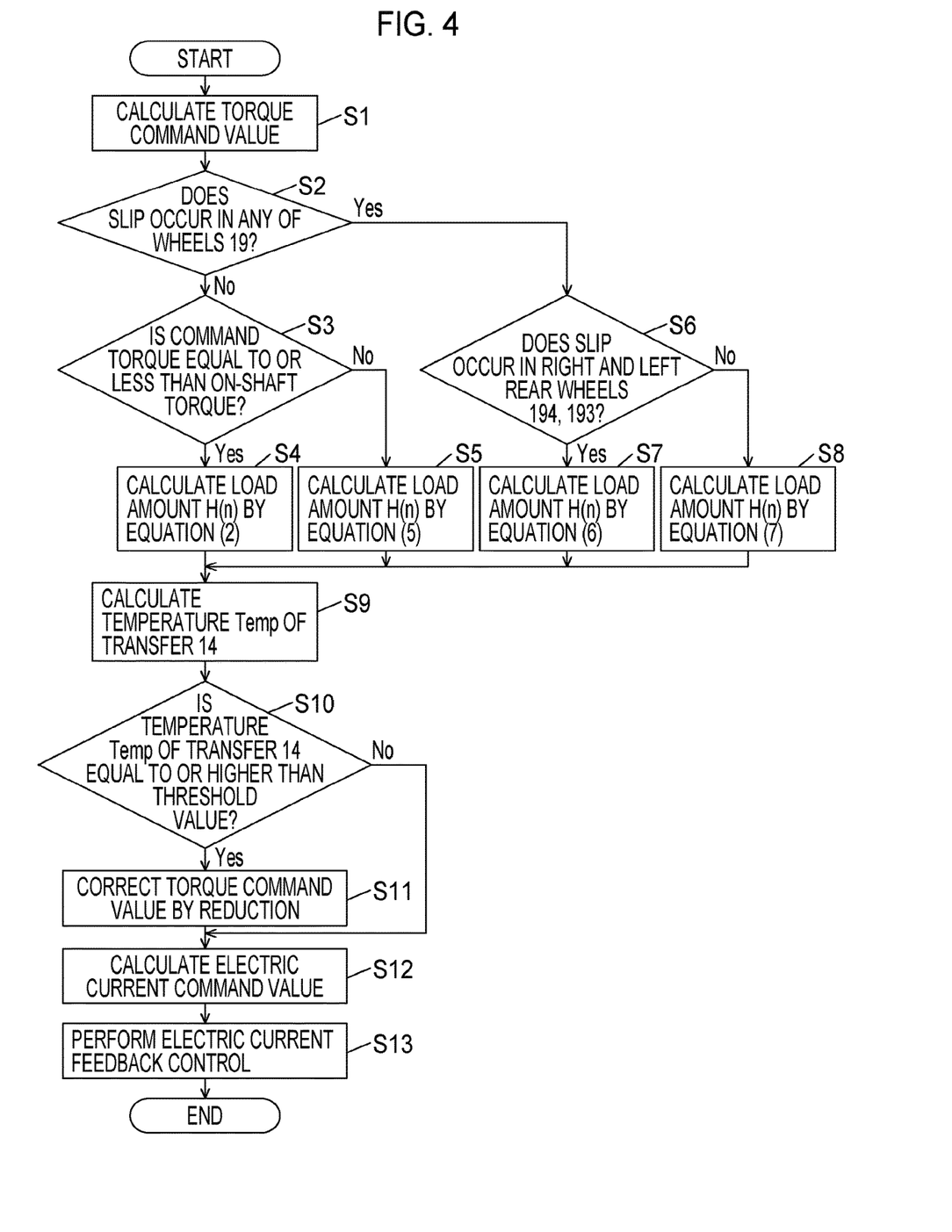
FIG. 4 is a flowchart of an example of a calculation process executed by a controller.

FIG. 4 is a flowchart of an example of a calculation process executed by the controller 60. The controller 60 repeatedly executes the process shown in the flowchart every predetermined control cycle (for example, 5 ms).

The controller 60 calculates the torque command value based on vehicle information (step S1). Next, the controller 60 determines whether or not a slip occurs in any of the right and left front wheels 192, 191 and the right and left rear wheels 194, 193 among the wheels 19 (step S2). The determination can be made, for example, depending on whether or not, among the wheels 19, the ratio of the rotation speed of the wheel having the fastest wheel speed to the rotation speed of the wheel having the slowest wheel speed is equal to or greater than the threshold value.

When determination is made in step S2 that a slip does not occur (No in S2), the controller 60 determines whether or not the command torque is equal to or less than the on-shaft torque (step S3). Then, when the command torque is equal to or less than the on-shaft torque (Yes in S3), the controller 60 calculates the load amount H(n) of the transfer 14 by the equation (2) (step S4). On the other hand, when the command torque is larger than the on-shaft torque (No in S3), the controller 60 calculates the load amount H(n) of the transfer 14 by the following equation (5) (step S5).

$$H(n) = K3 \times \Sigma \{K4 \times Tq \times Vf - K5 \times H(n-1)\} \quad (5)$$

Here, K3, K4, K5, and Vf are the same as those in the equation (2), and Tq is the on-shaft torque.

Further, when the controller 60 determines in step S2 that a slip occurs (Yes in S2), the controller 60 determines whether or not a slip occurs in one or both of the right and left rear wheels 194, 193 (step S6). When a slip occurs in at least one of the right and left rear wheels 194, 193 (Yes in S6), the controller 60 calculates the load amount H(n) of the transfer 14 by the following equation (6) (step S7).

$$H(n) = K3 \times \Sigma \{K4 \times Tg \times Vf - K5 \times H(n-1)\} \quad (6)$$

Here, K3, K4, K5, and Vf are the same as in the equation (2), and Tg is a converted value of the grip force calculated by the equation (3) with W as the rear wheel load.

On the other hand, when a slip does not occur in the right and left rear wheels 194, 193 and occurs in at least one of the right and left front wheels 192, 191 (No in S6), the controller 60 calculates the load amount H(n) of the transfer 14 by the following equation (7) (step S8).

$$H(n) = K3 \times \Sigma \{K4 \times (Tq - Tg) \times Vf - K5 \times H(n-1)\} \quad (7)$$

Here, K3, K4, K5, and Vf are the same as those in the equation (2), and Tq is the on-shaft torque. Tg is a converted value of the grip force calculated by the equation (3) with W as the front wheel load.

The controller 60 calculates the load amount H(n) of the transfer 14 in any of steps S4, S5, S7, and S8, and then uses the calculated load amount H(n) to calculate the temperature Temp of the transfer 14 according to the equation (1) (step S9) and determines whether or not the temperature Temp of the transfer 14 is equal to or higher than the threshold value (step S10). Then, when the temperature Temp of the transfer 14 is equal to or higher than the threshold value (Yes in S10), the torque command value calculated in step S1 is corrected to be reduced (step S11). Specifically, the reduction correction of the torque command value may be performed by multiplying the torque command value calculated in step S1 by a coefficient less than 1 and setting the value obtained by the multiplying as the correction torque command value, and may be performed by subtracting a predetermined value from the torque command value and setting the value obtained by the subtracting as the correction torque command value. Further, the correction torque command value may be limited to a predetermined value or less.

Then, the controller 60 calculates an electric current command value based on the torque command value calculated in step S1 or the correction torque command value corrected by reduction in step S11 (step S12), and performs electric current feedback control such that the electric current corresponding to the electric current command value is supplied to the electromagnetic coil 53 (step S13).

In the flowchart, the operation of step S1 is the operation as the torque command value calculation means 61, and the operations of steps S2 to S9 are the operations as the temperature estimation means 62. Further, the operations of steps S10 and S11 are the operations as the overheat protection control means 63, the operation of step S12 is the operation as the electric current command value calculation means 64, and the operation of step S13 is the operation as the electric current control means 65. The process of the above flowchart may be modified as follows.

Modified Example 1

In the operation of step S7, when a slip occurs in just one of the right and left rear wheels 194, 193 among the wheels 19, a value may be set as the converted value of the grip force, the value being obtained by calculating the load of the wheel 19 in which the slip occurs taking into account the accelerations in the front-rear direction and the lateral direction of the vehicle and doubling the calculated load and applying the doubled load to the equation (3) as the variable W. Further, in the operation of step S8, when a slip occurs in just one of the right and left front wheels 192, 191 among the wheels 19, a value may be set as the converted value of the grip force, the value being obtained by calculating the load of the wheel 19 in which the slip occurs taking into account the accelerations in the front-rear direction and the lateral direction of the vehicle and doubling the calculated load and applying the doubled load to the equation (3) as the variable W.

Modified Example 2

In addition to Modified Example 1, when the rear differential 16 having a differential limiting function for suppressing the differential rotation of the right and left rear wheels 194, 193 is used, a value may be set as the converted value of the grip force, the value being obtained by further multiplying the load of the wheel (slipping wheel) of the wheels 19 calculated taking into account the accelerations in the front-rear direction and the lateral direction of the vehicle by the coefficient of (torque bias ratio+1) and applying the multiplied value to the equation (3) as the variable W. Further, when the front differential 13 having a differential limiting function for suppressing the differential rotation of the right and left front wheels 192, 191 is used, a value may be set as the converted value of the grip force, the value being obtained by further multiplying the load of the wheel (slipping wheel) of the wheels 19 calculated taking into account the accelerations in the front-rear direction and the lateral direction of the vehicle by the coefficient of (torque bias ratio+1) and applying the multiplied value to the equation (3) as the variable W.

Modified Example 3

When the road surface friction coefficient $\mu$ can be estimated individually for each of the wheels 19, the value of $\mu$ used in the equation (3) may be individually estimated value.

Effect of Embodiment

According to the embodiment of the disclosure described above, it is possible to estimate the temperature of the transfer 14 with high accuracy even when a slip occurs in the wheels 19 or the on-shaft torque is smaller than the torque command value T, thereby making it possible to suppress the decrease in the driving force transmitted by the driving force transmission device 2 more than required and appropriately perform overheat protection of the transfer 14. Further, according to Modified Examples 1 to 3, it is possible to estimate the temperature of the transfer 14 more accurately.

Additional Remark

Although the disclosure has been described above based on the embodiment, the embodiment does not limit the disclosure according to the claims. It is to be noted that not all combinations of the features described in the embodiment are essential to the means for solving the problems of the disclosure.

The disclosure can be appropriately modified without departing from the spirit of the disclosure by omitting a part of configurations or adding or replacing configurations. For example, in the above embodiment, the case where the temperature of the transfer 14 as the heat generating location of the driving force transmission system 10 is estimated has been described, but the disclosure is not limited thereto, and for example, temperature estimation and overheat protection on the heat generating location may be performed by setting the rear differential 16, the propeller shaft 15, or the driving force transmission device 2 as the heat generating location.

Further, in the above embodiment, although the driving force transmission device 2 has been described as being disposed between the propeller shaft 15 and the rear differential 16, the disposition of the driving force transmission device 2 is not limited thereto, and The driving force transmission device 2 may be disposed, for example, between the rear differential 16 and the right and left rear wheels 194, 193.

Further, in the above embodiment, although the main clutch 3 has been described as being pressed by the cam mechanism 4 and the electromagnetic clutch mechanism 5, the disclosure is not limited thereto, and the main clutch 3 may be pressed by, for example, an electric motor or a hydraulic piston.

Further, in the above embodiment, although the disclosure has been described as being applied to the four-wheel drive vehicle 1 in which the right and left front wheels 192, 191 are main drive wheels to which the driving force of the engine 11 is constantly transmitted, and the right and left rear wheels 194, 193 are auxiliary drive wheels to which the driving force of the engine 11 is transmitted depending on the vehicle status, the disclosure could be also applied to a four-wheel drive vehicle in which the right and left rear wheels are the main drive wheels and the right and left front wheels are the auxiliary drive wheels.

What is claimed is:

1. A vehicle control device that is mounted on a four-wheel drive vehicle and controls a driving force transmission device, the four-wheel drive vehicle including a driving force transmission system that distributes a driving force of a drive source to main drive wheels and auxiliary drive wheels, the driving force transmitted to the auxiliary drive wheels being adjustable by the driving force transmission device, the vehicle control device comprising an electronic control unit, wherein:
   the electronic control unit is configured to calculate a command torque based on vehicle information, the command torque indicating the driving force to be transmitted from an input rotating member of the driving force transmission device to an output rotating member of the driving force transmission device;
   the electronic control unit is configured to estimate a temperature of a heat generating location in the driving force transmission system based on the command torque; and
   the electronic control unit is configured to estimate the temperature of the heat generating location based on an estimated value of the driving force input to the input rotating member, when the driving force corresponding to the command torque is not able to be transmitted to the auxiliary drive wheels due to a magnitude of the driving force generated by the drive source or occurrence of a wheel slip.

2. The vehicle control device according to claim 1, wherein the electronic control unit is configured to estimate the temperature of the heat generating location by using a first converted value as the estimated value when a slip occurs in the auxiliary drive wheel, the first converted value being a value obtained by converting a grip force of the auxiliary drive wheel into a torque of the input rotating member.

3. The vehicle control device according to claim 1, wherein the electronic control unit is configured to estimate the temperature of the heat generating location by using a second calculated value obtained by subtracting a second converted value from a first calculated value as the estimated value when a slip occurs in the main drive wheel, the second converted value being a value obtained by converting a grip force of the main drive wheel into a torque of the input rotating member, the first calculated value being a calculated value of the driving force transmitted from the drive source to the input rotating member.

4. The vehicle control device according to claim 3, wherein the electronic control unit is configured to calculate the grip force by taking into account a load of a wheel where the slip occurs.

5. The vehicle control device according to claim 2, wherein the electronic control unit is configured to calculate the grip force by taking into account a load of a wheel where the slip occurs.

6. The vehicle control device according to claim 1, wherein the electronic control unit is configured to estimate the temperature of the heat generating location by using a first calculated value as the estimated value when a slip does not occur in the main drive wheels and the auxiliary drive wheels and the first calculated value is smaller than the command torque, the first calculated value being a calculated value of the driving force transmitted from the drive source to the input rotating member.

7. The vehicle control device according to claim 1, wherein the electronic control unit is configured to suppress heat generation at the heat generating location by reducing the driving force transmitted by the driving force transmission device when determination is made that the heat generating location is in an overheated state by the estimated temperature.

8. A four-wheel drive vehicle comprising:
a driving force transmission system configured to distribute a driving force of a drive source to main drive wheels and auxiliary drive wheels; and
a vehicle control device that includes an electronic control unit configured to control a driving force transmission device by which the driving force transmitted to the auxiliary drive wheels is adjustable, wherein:
the electronic control unit is configured to calculate a command torque indicating the driving force to be transmitted from an input rotating member of the driving force transmission device to an output rotating member of the driving force transmission device, based on vehicle information;
the electronic control unit is configured to estimate a temperature of a heat generating location in the driving force transmission system based on the command torque; and
the electronic control unit is configured to estimate the temperature of the heat generating location based on an estimated value of the driving force input to the input rotating member, when the driving force corresponding to the command torque is not able to be transmitted to the auxiliary drive wheels due to a magnitude of the driving force generated by the drive source or occurrence of a wheel slip.

9. The four-wheel drive vehicle according to claim 8, wherein:
the driving force transmission system includes a propeller shaft that transmits the driving force in a front-rear direction of the four-wheel drive vehicle and a transfer that transmits the driving force to the propeller shaft; and
the electronic control unit is configured to estimate a temperature of the transfer as the heat generating location.

* * * * *